United States Patent
Su et al.

(10) Patent No.: US 11,580,665 B2
(45) Date of Patent: Feb. 14, 2023

(54) IMAGE POSITIONING SYSTEM AND IMAGE POSITIONING METHOD BASED ON UPSAMPLING

(71) Applicant: Delta Electronics, Inc., Taoyuan (TW)

(72) Inventors: Yu-Cheng Su, Taoyuan (TW); Qi-Ming Huang, Taoyuan (TW); Yi-Jiun Shen, Taoyuan (TW); Hung-Wen Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 302 days.

(21) Appl. No.: 16/714,689

(22) Filed: Dec. 14, 2019

(65) Prior Publication Data

US 2020/0193635 A1 Jun. 18, 2020

(30) Foreign Application Priority Data

Dec. 17, 2018 (CN) .......................... 201811542819.5

(51) Int. Cl.
*G06T 7/73* (2017.01)
*G06T 3/40* (2006.01)
(Continued)

(52) U.S. Cl.
CPC .............. *G06T 7/74* (2017.01); *G06T 3/4046* (2013.01); *G06T 3/4053* (2013.01); *G06T 5/002* (2013.01);
(Continued)

(58) Field of Classification Search
CPC ........... G06T 7/74; G06T 7/73; G06T 3/4046; G06T 2207/30141; G06T 3/4053;
(Continued)

(56) References Cited

U.S. PATENT DOCUMENTS

2018/0075581 A1* 3/2018 Shi ...................... G06N 3/0472
2020/0202492 A1* 6/2020 Amano ............ H04N 5/232133

FOREIGN PATENT DOCUMENTS

| CN | 105184795 A | 12/2015 |
| CN | 106952220 A | 7/2017 |
| TW | 201642378 A | 12/2016 |

OTHER PUBLICATIONS

Li, Sumei, et al. "A two-channel convolutional neural network for image super-resolution." Neurocomputing 275 (2018): 267-277. (Year: 2017).*

(Continued)

*Primary Examiner* — Geoffrey E Summers
(74) *Attorney, Agent, or Firm* — Chun-Ming Shih; HDLS IPR Services

(57) ABSTRACT

An image positioning system based on upsampling and a method thereof are provided. The image positioning method based on upsampling is to fetch a region image covering a target from a wide region image, determine a rough position of the target, execute an upsampling process on the region image based on neural network data model for obtaining a super-resolution region image, map the rough position onto the super-resolution region image, and analyze the super-resolution region image for determining a precise position of the target. The present disclosed example can significantly improve the efficiency of positioning and effectively reduce the required cost of hardware.

14 Claims, 9 Drawing Sheets

(51) Int. Cl.
*G06T 7/00* (2017.01)
*G06T 5/00* (2006.01)
(52) U.S. Cl.
CPC .............. *G06T 5/009* (2013.01); *G06T 7/001* (2013.01); *G06T 2207/20084* (2013.01); *G06T 2207/20221* (2013.01); *G06T 2207/30141* (2013.01)
(58) Field of Classification Search
CPC ....... G06T 5/002; G06T 5/009; G06T 7/0002; G06T 7/0004; G06T 7/0006; G06T 7/0008; G06T 7/001; G06T 2207/20084; G06T 2207/20081; G06T 2207/20221; G06T 2207/10004; G06T 2207/20016; H05K 13/081; H05K 13/0812; H05K 13/0813; H05K 13/0815; H05K 13/0817; G06N 3/02–088
See application file for complete search history.

(56) References Cited

OTHER PUBLICATIONS

Liu, Ding, et al. "Robust single image super-resolution via deep networks with sparse prior." IEEE Transactions on Image Processing 25.7 (2016): 3194-3207. (Year: 2016).*
Wang, Qianqian, et al. "Accurate localization of circular mark based on interpolation algorithm and modified Hough transform." 2008 7th World Congress on Intelligent Control and Automation. IEEE, 2008. (Year: 2008).*
Dong, Chao, Chen Change Loy, and Xiaoou Tang. "Accelerating the super-resolution convolutional neural network." European conference on computer vision. Springer, Cham, 2016. (Year: 2016).*
Yadav, Vivek, "Improved performance of deep learning neural network models for Traffic sign classification using brightness augmentation (99.1% solution)." Jan. 9, 2017. Medium. (Year: 2017).*
Allred, Ryan, "Image Augmentation for Deep Learning using Keras and Histogram Equalization." Jul. 10, 2017. Towards Data Science. (Year: 2017).*
Bai, Yancheng, et al. "SOD-MTGAN: Small Object Detection via Multi-Task Generative Adversarial Network." European Conference on Computer Vision. Springer, Cham, 2018. (Year: 2018).*
Bei, Yijie, et al. "New Techniques for Preserving Global Structure and Denoising with Low Information Loss in Single-Image Super-Resolution." arXiv preprint arXiv:1805.03383v2 (2018). (Year: 2018).*
Haris, Muhammad, Greg Shakhnarovich, and Norimichi Ukita. "Task-driven super resolution: Object detection in low-resolution images." arXiv preprint arXiv:1803.11316v1 (2018). (Year: 2018).*
Lau, Suki. "Image Augmentation for Deep Learning." Jul. 10, 2017. Towards Data Science. (Year: 2017).*
Karim, Md. Rezzaul. "Object classification, localization, and detection." Java Deep Learning Projects, e-book ed., Packt Publishing, 2018. (Year: 2018).*
Liu, Lei, Zongxu Pan, and Bin Lei. "Learning a rotation invariant detector with rotatable bounding box." arXiv preprint arXiv:1711.09405v1 (2017). (Year: 2017).*
Shorten, Connor. "Applying GANs to Super Resolution," Towards Data Science, Dec. 15, 2018. <https://towardsdatascience.com/applying-gans-to-super-resolution-59224763f960>. (Year: 2018).*
Bulat, Adrian, Jing Yang, and Georgios Tzimiropoulos. "To learn image super-resolution, use a GAN to learn how to do image degradation first." arXiv preprint arXiv:1807.11458v1 (2018). (Year: 2018).*
Chen, Li, et al. "Joint denoising and super-resolution via generative adversarial training." 2018 24th International Conference on Pattern Recognition (ICPR). IEEE, 2018. (Year: 2018).*
Yang, Wenhan, et al. "Reference-guided deep super-resolution via manifold localized external compensation." IEEE Transactions on Circuits and Systems for Video Technology 29.5 (2018): 1270-1283. (Year: 2018).*
Office Action dated Nov. 6, 2019 of the corresponding Taiwan patent application.

\* cited by examiner

IMAGE POSITIONING SYSTEM AND IMAGE POSITIONING METHOD BASED ON UPSAMPLING

BACKGROUND OF THE INVENTION

Field of the Invention

The technical field relates to image positioning technology and more particularly related to an image positioning system and an image positioning method based on upsampling.

Description of Related Art

The image positioning technology is a very important part of the automatically manufacturing procedure. Take automatically assembling for example, automation equipment has the ability to recognize the position of each assembly structure of each assembly object by the image positioning technology, and assembles the assembly objects together by each of the assembly structures being recognized. Take the automation punching machine for example, the automation punching machine has the ability to recognize the position to be perforated, and executes a punching operation accurately.

For execution of precisely positioning, most of the image positioning technologies in the related art are to capture an object and the surroundings (such as a carrier for carrying the object) by a high-resolution camera for obtaining a high-resolution wide region image, execute the object-recognizing process on the high-resolution wide region image for recognizing the object in the high-resolution wide region image, and execute the image positioning process for computing a precise position of the object.

Because the execution of the object-recognizing process and the image positioning process of the image positioning technologies in the related art must is based on the whole high-resolution wide region image, this will cost a lot of computing resources and computing time spent will be very long. Thus, the positioning efficiency of the image positioning technologies in the related art is too low to satisfy the requirement. Moreover, the image positioning technologies in the related art will increase a lot of hardware cost because the costly high-resolution camera is necessary.

Thus, the image positioning technologies in the related art have the above-mentioned problems, there is a need for a more effective solution.

SUMMARY OF THE INVENTION

The disclosure is directed to an image positioning system based on upsampling and an image positioning method having the ability to narrow down the range to be executed the recognition process and the positioning process, and generate the super-resolution image by the machine learning technology.

In one of the exemplary embodiments, an image positioning method based on upsampling includes steps of fetching a region image covering a target in a wide region image, and determining a rough position of the target; executing an upsampling process on the region image based on a neural network data model for obtaining a super-resolution region image, wherein a resolution of the super-resolution region image is higher than a resolution of the region image; mapping the rough position onto the super-resolution region image; and analyzing the super-resolution region image for determining a precise position of the target, wherein accuracy of the precise position is better than accuracy of the rough position.

In one of the exemplary embodiments, an image positioning system based on upsampling, includes an image capture apparatus, a storage device and a processor. The image capture apparatus is used to capture image of a target for generating a wide region image, the storage device is used to store a neural network data model, and the processor is configured to/for electrically connected to the image capture apparatus and the storage device, the processor is configured to fetch a region image covering the target in the wide region image, determine a rough position of the target, execute an upsampling process on the region image for obtaining a super-resolution region image, mapping the rough position onto the super-resolution region image, and determine a precise position of the target by analyzing the super-resolution region image, wherein a resolution of the super-resolution region image is higher than a resolution of the region image, and an accuracy of the precise position is better than an accuracy of the rough position.

The present disclosed example can significantly improve the efficiency of positioning and effectively reduce the required cost of hardware.

BRIEF DESCRIPTION OF DRAWINGS

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
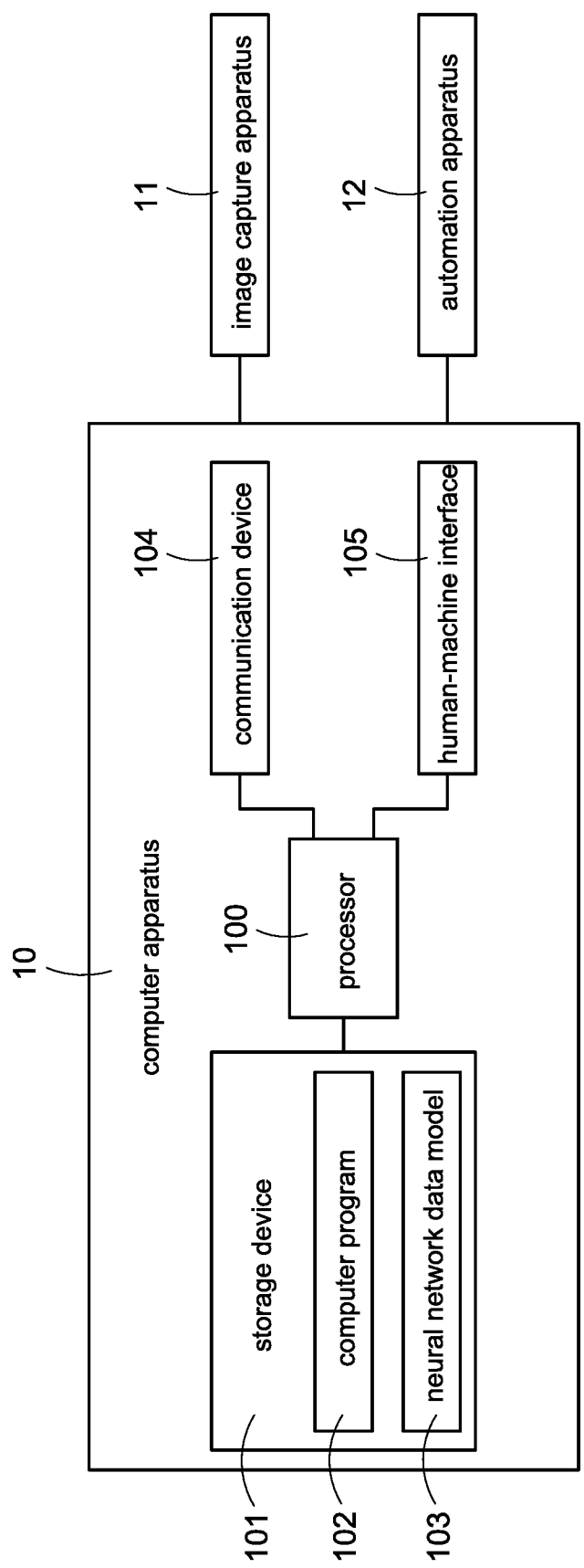
FIG. 1 is an architecture diagram of an image positioning system based on upsampling according to one implement aspect of the present disclosed example.

Please refer to FIG. 1 illustrating an architecture diagram of an image positioning system based on upsampling according to one implement aspect of the present disclosed example. An image positioning system based on upsampling having the ability to recognize a target according to a wide region image having the low-resolution and locate the target precisely is disclosed by the present disclosed example. More specifically, when there is a request to position a target (such as an electronic element or a designated element, a designated structure on a printed circuit board, and so on), the image positioning system based on upsampling may capture the target and surroundings (such as a carrier for carrying the electronic elements or all or part of the printed circuit board) for generating a wide region image having the wider field of view (namely, the covering range is wider) and the lower resolution. Then, the image positioning system based on upsampling of the present disclosed example may execute the following image positioning method on the wide region image to recognize a precise position of the target in the wide region image.

The image positioning system based on upsampling of the present disclosed example includes a computer apparatus 10. The computer apparatus 10 mainly includes a storage device 101, a communication device 104, a human-machine interface 105, and a processor 100 electrically connected to above devices.

The storage device 101 is used to store data. In one of the exemplary embodiments, the storage device 101 stores a neural network data model 103. Above neural network data model 103 is built by executing analysis and training on a great amount of sample images based on machine learning technology (such as deep learning or neural network). Above neural network data model 103 includes a great number of rules generated by training, and may be used to execute an upsampling process on image based on the great number of rules to increase the resolution of the image.

The communication device 104, such as USB module, PCI bus module, Wi-Fi module or Bluetooth module, is used to connect to the external devices, such as the image capture apparatus 11 and/or the automation apparatus 12, and has the ability to communicate with the external devices, such as receiving the wide region image described later from the image capture apparatus 11, or transferring the precise position described later to the automation apparatus 12.

The human-machine interface 105, such as buttons, display, indicators, a buzzer, or any combination of the above elements, is used to receive a user operation and output the information.

The processor is used to control the computer apparatus 10. In one of the exemplary embodiments, the storage device 101 may include a non-transitory computer-readable media, the non-transitory computer-readable media stores a computer program 102. The computer program 102 records a plurality of computer-executable codes or machine code for implementing the method of each embodiment of the exemplary embodiments. The processor may perform each step of the method of each embodiment of the present disclosed example after the execution of the computer-executable codes or machine code of the computer program 102.

In one of the exemplary embodiments, the image positioning system based on upsampling of the exemplary embodiments further includes an image capture apparatus 11. The computer apparatus 10 may be connected to the image capture apparatus 11 by the communication device 104. The image capture apparatus 11 may be used to capture a designated target, such as capture images toward all or part of a printed circuit board.

In one of the exemplary embodiments, the image capture apparatus 11 is a camera having the ability to generate only the low-resolution images and its hardware cost is lower. The image capture apparatus 11 may be a monochrome camera, color camera or Infrared camera. The image captured by the image capture apparatus 11 can be processed by the computer apparatus 10 for recognizing a position of the target in the image.

In one of the exemplary embodiments, the image capture apparatus 11 is a monochrome camera and used to generate a monochrome image (such as a black and white image). Thus, the generated image doesn't include the combination of colors, so the efficiency and accuracy of recognition will be improved.

In one of the exemplary embodiments, the image positioning system based on upsampling of the present disclosed example further an automation apparatus 12, such as an automation punching machine, an automation assembly machine and so on. The computer apparatus 10 may be connected to the automation apparatus 12 by the communication device 104. The automation apparatus 12 may be used to execute the designated process or operation to the target according to the precise position of the target, such as the assembly process, the punching process, the splicing process and so on.

Figure 5:
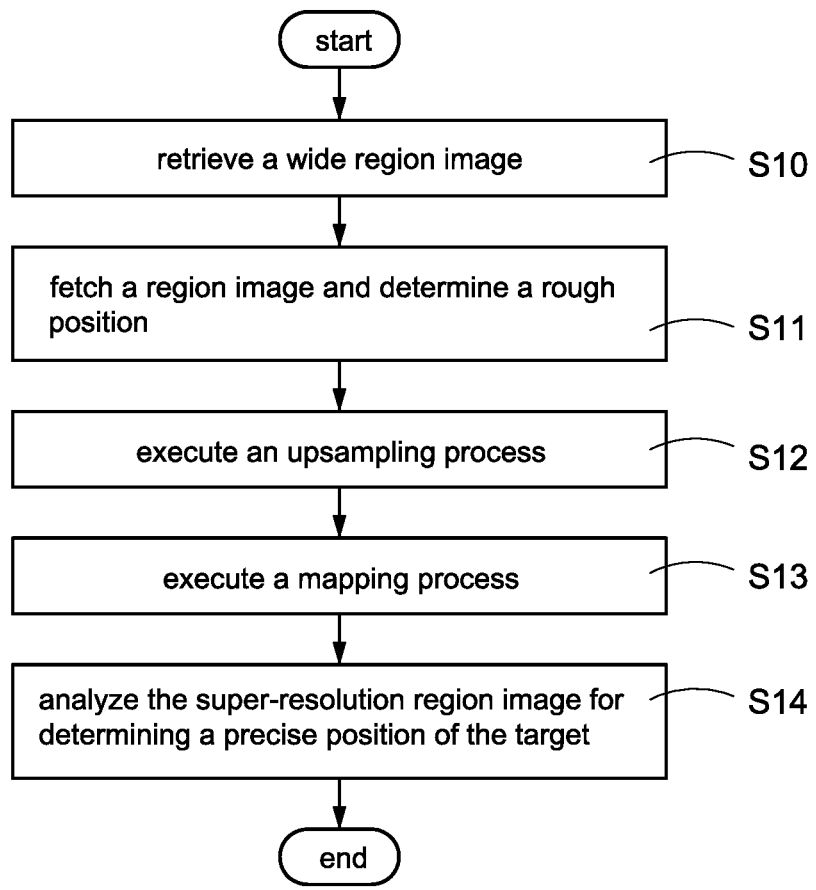
FIG. 5 is a flowchart of an image positioning method according to a first embodiment of the present disclosed example.

Please refer to FIG. 5 which illustrates a flowchart of an image positioning method according to a first embodiment of the present disclosed example. The method of each embodiment of the present disclosed example may be implemented by the image positioning system based on upsampling shown in FIG. 1. More specifically, the image positioning method of this embodiment includes following steps.

Step S10: the processor 100 of the computer apparatus 10 retrieves a wide region image covering the target. The field of view of the above wide region image is wider (namely, the covering range of the wide region image is wider), and the resolution of the wide region image is relatively low.

In one of the exemplary embodiments, the user may operate the image capture apparatus 11 in advance to capture the target and surroundings for obtaining the above wide region image and making the wide region image being stored in the storage device 101. Moreover, the processor 100 loads the above wide region image from the storage device 101 in the step S10.

In one of the exemplary embodiments, the processor 100 is configured to capture the target and surroundings thereof instantly for generating the wide region image instantly.

Step S11: the processor 100 recognizes the target in the wide region image being retrieved, crops a region image covering the target, and determines a rough position of the target.

In one of the exemplary embodiments, the processor 100 builds a coordinate system on the wide region image, and configures the range expressed by the coordinate of the region image in the wide region image to be the above rough position.

Please be noted that both the field of view and the data volume of the region image must be narrower and less than the field of view and the data volume of the wide region image because the region image is a part of the wide region image. The present disclosed example can reduce the data volume to be processed and save the time spent on executing the processes via executing the analysis and process only on the smaller region image covering the target.

Moreover, the above-mentioned cropping processing does not deteriorate the result of positioning because one of the main purposes of the present disclosed example is positioning the target, and the other images without covering the target are not necessary in the present disclosed example.

Step S12: the processor 100 loads the neural network data model 103 from the storage device 101, and executes an upsampling process on the region image being cropped based on the neural network data model 103 for obtaining a super-resolution region image. A resolution of the super-resolution region image is higher than the resolution of the region image. For example, the field of view of the super-resolution region image and field of view of the region image are the same as each other, but the number of pixels of the super-resolution region image is larger than the number the pixels of the region image.

Please be noted that the upsampling technology could be the existed upsampling technology in the art of Artificial Intelligence. The upsampling technology is to train a data model based on Machine Learning, and increase the resolution of the image based on the data model. Moreover, in the following description, the present disclosed example further discloses one upsampling technology having novelty, inventive step and being different from the upsampling technology of the related art.

According to the disclosure of the present disclosed example, persons skilled in the art of the present disclosed example can understand that both any upsampling technology in the related art and the upsampling technology disclosed in the present disclosed example may be applied to the image positioning of the present disclosed example.

Step S13: the processor 100 maps the rough position onto the super-resolution region image for applying the positioning mechanism of the wide region image to the super-resolution region image. Thus, a mapping relationship between each pixel of the super-resolution region image and pixels of the wide region image may be built, and the position (such as the coordinate) mapping to the wide region image of each pixel of the super-resolution region image may be obtained.

Step S14: the processor 100 analyzes the super-resolution region image for recognizing the target in the super-resolution region image, and determines the precise position of the target being recognized. An accuracy of the above precise position is better than an accuracy of the above rough position.

In one of the exemplary embodiments, the processor 100 firstly determines a position of the target in the super-resolution region image, and computes the precise position of the target in the wide region image based on the mapping relationship between each pixel of the super-resolution region image and the pixels of the region image.

Please be noted that the neural network data model 103 is stored in the computer apparatus 10 of the local-end, and the computer apparatus 10 executes the image positioning method in this embodiment, but this specific example is not intended to limit the scope of the present disclosed example.

In one of the exemplary embodiments, the neural network data model 103 may be stored in a cloud server (not shown in figures). Moreover, the computer apparatus 10 uploads the wide region image to the cloud server by network, the cloud server executes the image positioning method of the present disclosed example, and returns the processing result (such as the precise position) back to the computer apparatus 10. Thus, the present disclosed example can reduce the usage of the storage resources used by image positioning of the storage device 101, and reduce the usage of processing resource of the processor 100.

The present disclosed example can narrow down the range to be executed the recognition process and the positioning process via only cropping the partial image of the wide region image to process, and significantly improve the efficiency of positioning. The present disclosed example can make the usage of the high-resolution camera be not necessary via generating the super-resolution region image based on the neural network data model, and effectively reduce the required cost of hardware.

Figure 6:
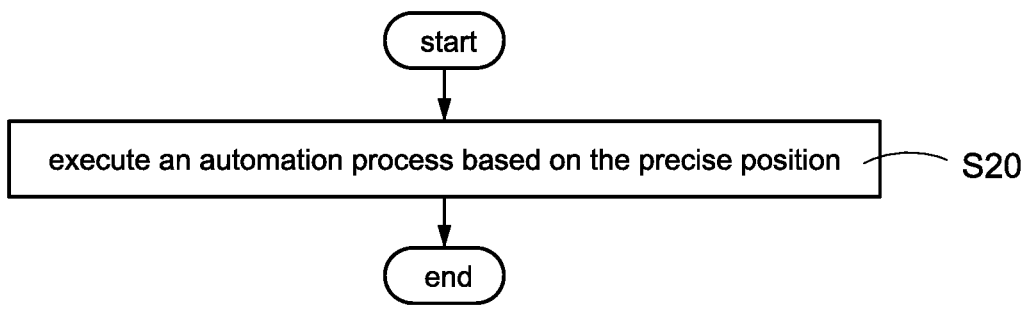
FIG. 6 is a flowchart of an automation process according to a second embodiment of the present disclosed example.

Please refer to FIG. 5 and FIG. 6 together. FIG. 6 illustrates a flowchart of an automation process according to a second embodiment of the present disclosed example. A function of automation process is further provided by the present disclosed example. More specifically, the image positioning method of this embodiment includes following steps after the determination of precise position.

Step S20: the processor 100 of the computer apparatus 10 executes an automation process according to the computed precise position of the target.

In one of the exemplary embodiments, the computer apparatus 10 may control the automation apparatus 12 executes an assembling process at the precise position of the printed circuit board (such as marking operation, welding operation, punching operation and so on) if the target is the designated element or the designated structure on the printed circuit board.

In one of the exemplary embodiments, the computer apparatus 10 may control the automation apparatus 12 to execute the assembling process (such as assembling the latch, screwing on, spray adhesive and so on) at the precise position of the object if the target is the image of the assembly structure of the object (such as a latch, mounting hole, junction and so on).

Figure 3:
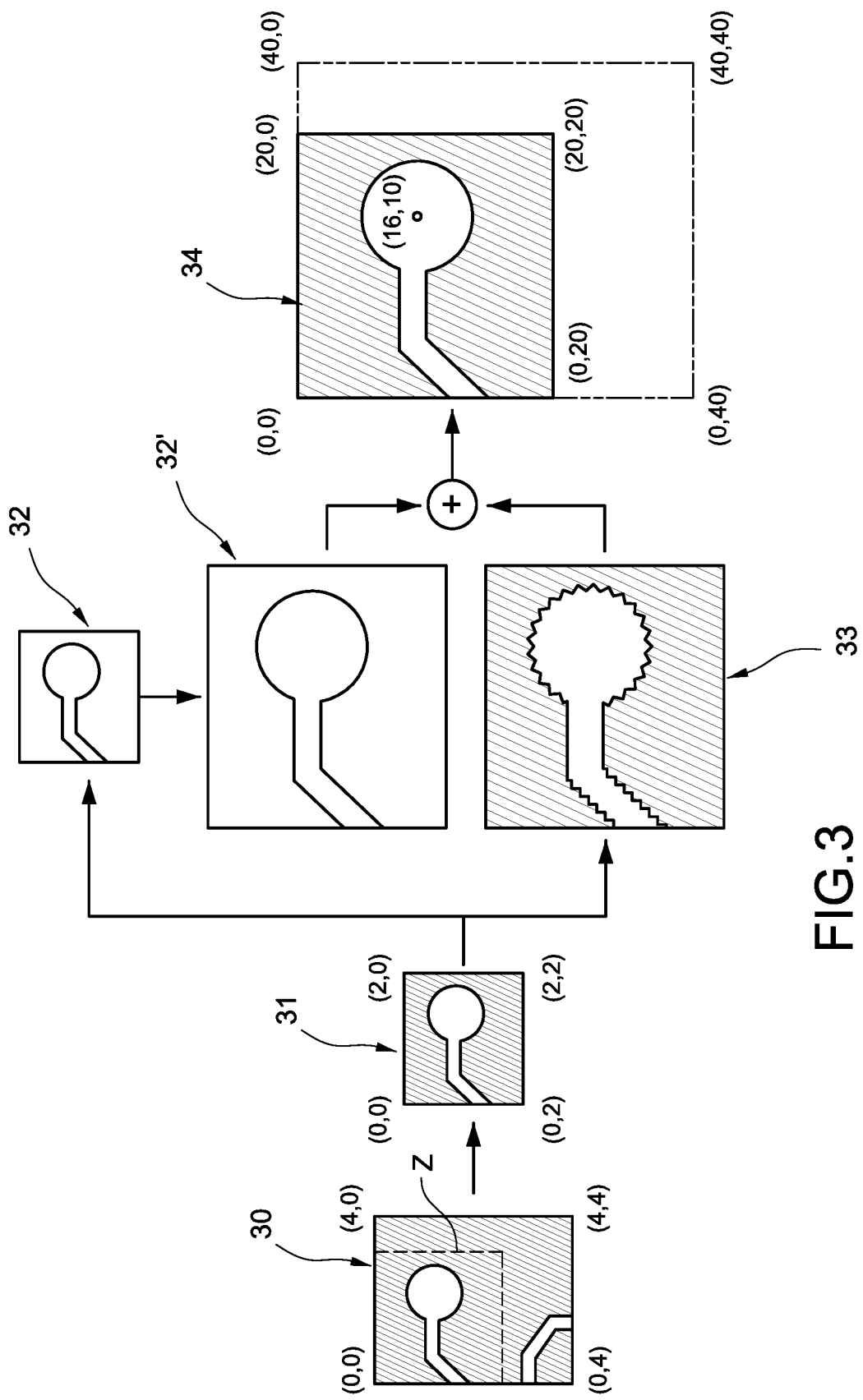
FIG. 3 is a schematic view of an image positioning process according to one implement aspect of the present disclosed example.
Figure 7:
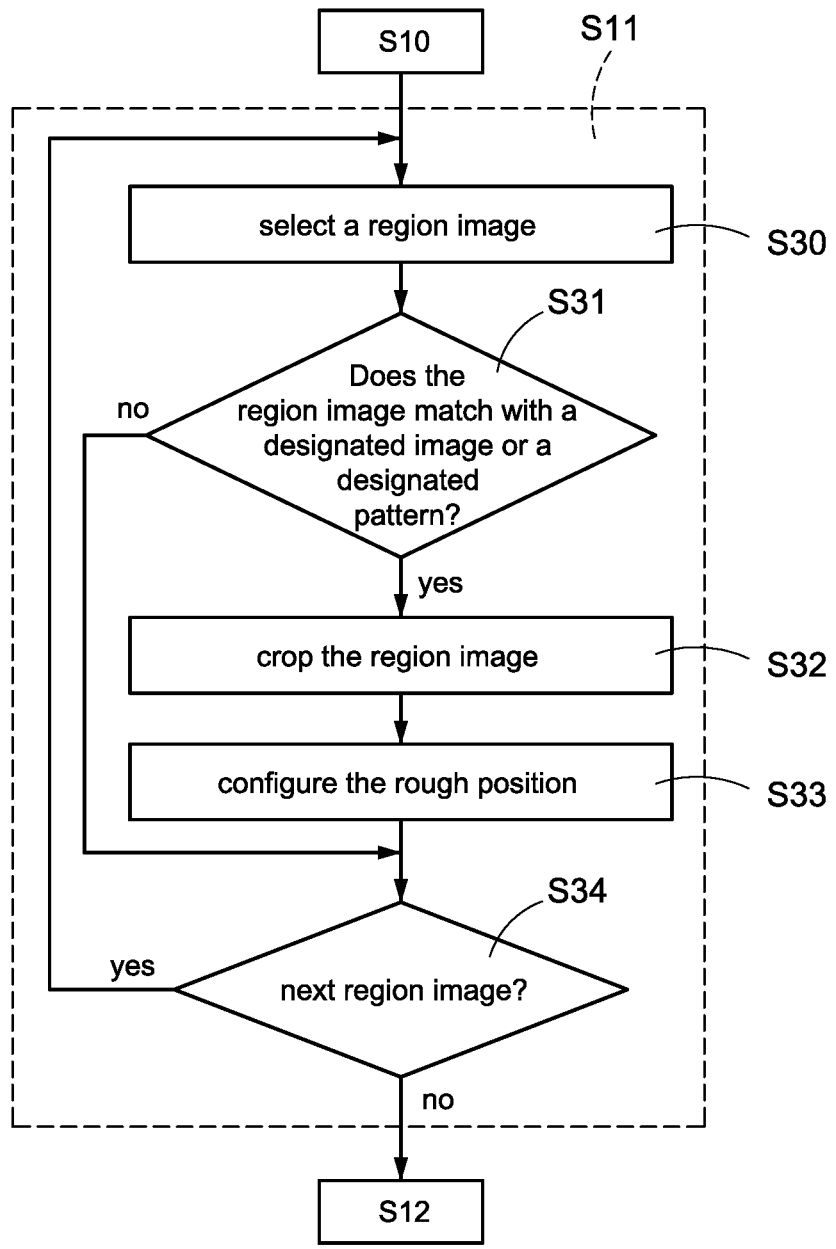
FIG. 7 is a flowchart of determining the rough position according to a third embodiment of the present disclosed example.

Please refer to FIG. 3, FIG. 5 and FIG. 7 together. FIG. 3 illustrates a schematic view of an image positioning process according to one implement aspect of the present disclosed example, and FIG. 7 illustrates a flowchart of determining the rough position according to a third embodiment of the present disclosed example. It will be described later with reference to the embodiment shown in FIG. 3.

In the embodiment shown in FIG. 3, the wide region image 30 having the size of 4×4 is the image of a printed circuit board and the target is the image of the designated hole on the printed circuit board. After a coordinate system is built on the wide region image 30, the coordinates of the four endpoints are respectively (0,0), (4,0), (0,4) and (4,4).

In comparison with the image positioning method shown in FIG. 5, the step S11 of the image positioning method of this embodiment further includes following steps for implementing the function of determining rough position.

Step S30: the processor 100 of the computer apparatus 10 selects one of the pluralities of region images respectively corresponding to the different regions in the wide region image 30, such as selecting the region image 31 of the first region Z.

Step S31: the processor 100 compares the selected region image 31 with a default designated image or designated pattern, and determines whether they match with each other.

In one of the exemplary embodiments, the designated image being the same as or very similar to the target is stored in the storage device 101 in advance, the processor 100 executes an image comparison process on the designated image and the selected region image 31 to determine whether they are the same as or very similar to each other for determining whether the region image 31 covers the target.

In one of the exemplary embodiments, one or more recognition rule for recognizing a designated pattern (such as round) is stored in the storage device 101 in advance, the processor 100 determines whether there is any image matching with the recognition rules to determine whether the region image 31 covers the target.

If the processor 100 determines that the region image 31 matches with the designated image or the designated pattern, step S32 is performed. Otherwise, the processor performs step S34.

Step S32: the processor 100 crops the matched region image 31 from the wide region image 30. Moreover, the region image 31 being cropped includes the images of the target and surroundings thereof.

In this embodiment, a size of the cropped region image 31 is 2×2, but this specific example is not intended to limit the scope of the present disclosed example.

Step S33: the processor 100 configures the rough position in the wide region image according to the selected region image.

In one of the exemplary embodiments, the above-mentioned rough position is the coordinate range of the region image 31 in the wide region image 30, such as the range surrounded by the four coordinates of the four endpoints of the region image 31, the four coordinates of the four endpoints are respectively (0,2), (2,2), (0,4) and (2,4).

Step S34: the processor 100 determines whether the comparisons of all the region images in the wide region image 31 have been finished.

If the comparison of any region image 31 is not done, the processor 100 performs the step S30 to select the next region image for comparison. Otherwise, the processor 100 executes the step S12.

In one of the exemplary embodiments, in the status of the region image 31 matching with the target having been found (namely, the steps S32 and S33 have been performed), the processor 100 may jump to perform step S12 after performing the step S33, and the step S34 does not be performed. Namely, the processor does not determine whether there is any other region image matching with the target.

Although above embodiment is to firstly crop the region image 31 and secondly configure the rough position, but this specific example is not intended to limit the scope of the present disclosed example.

In one of the exemplary embodiments, the present disclosed example can be modified to firstly configure the rough position and secondly crop the region image. More specifically, the processor 100 may firstly determine the position of the target in the wide region image 30, such as the coordinate (2,3), and then expand outward a designated distance (such as one pixel) from the above-mentioned position for obtaining one set of coordinate range, such as the range surrounded by the coordinates (1,2), (3,3), (2,4) and (3,4), make the coordinate range as the above-mentioned rough position, and crop the region image from the wide region image 30 based on the rough position.

Thus, the present disclosed example can effectively crop for obtaining the rough position to narrow the range to positioning, and can effectively retrieve the rough position corresponding to the region image.

Figure 2:
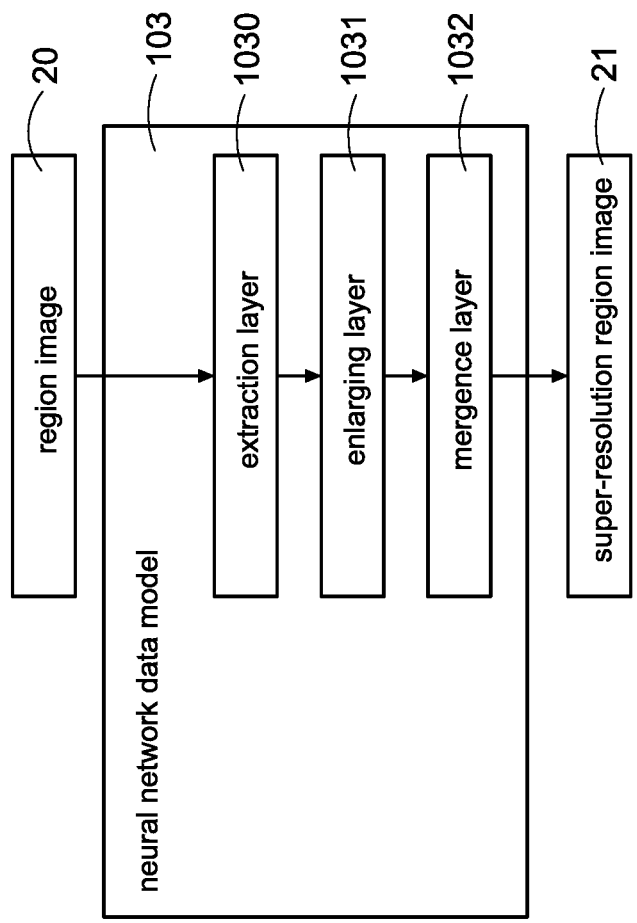
FIG. 2 is an architecture diagram of a neural network data model according to one implement aspect of the present disclosed example.
Figure 8:
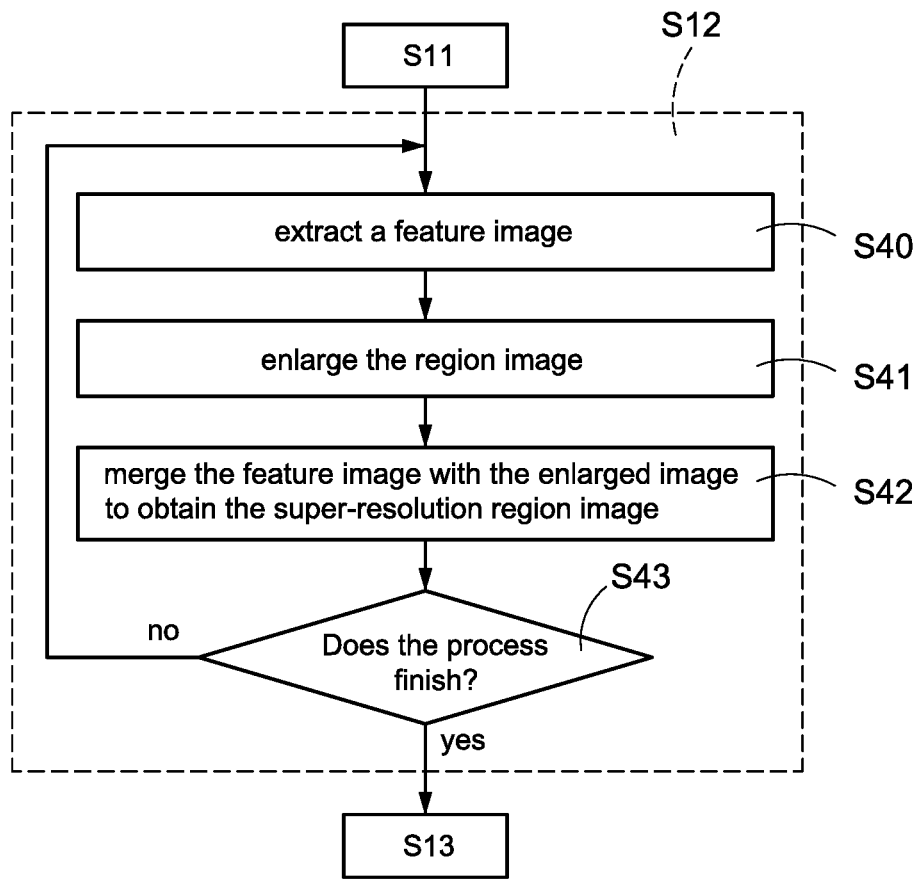
FIG. 8 is a flowchart of an upsampling process according to a fourth embodiment of the present disclosed example.

Please refer to FIG. 2, FIG. 3, FIG. 5 and FIG. 8 together. FIG. 2 illustrates an architecture diagram of a neural network data model according to one implement aspect of the present disclosed example, and FIG. 8 illustrates a flowchart of an upsampling process according to a fourth embodiment of the present disclosed example.

As shown in FIG. 2, in this embodiment, the present disclosed example further provides a neural network data model 103 trained based on the Artificial neural network technology, the neural network data model 103 is used to execute the upsampling function. Above-mentioned neural network data model 103 includes at least an extraction layer 1030 for extracting image features, an enlarging layer 1031 for enlarging image and a mergence layer 1032 for combining the image feature and the enlarged image.

In one of the exemplary embodiments the extraction layer 1030, the enlarging layer 1031, and the mergence layer 10321 are built based on convolutional neural network.

Please be noted that compare to the conventional deep learning network (deep neural network) ignoring the shape (such as the arrange information of the pixels) of data caused by using the fully connected layer. The neural network data model 103 built by the convolutional neural network of this embodiment will preserve the shape of data after training, such as using fully convolutional layers, so as to have better learning ability and higher accuracy for transforming the images.

Compare to the image positioning method shown in FIG. 5, step S12 of the image positioning method of this embodiment further includes following steps for implementing the upsampling function.

Step S40: the processor 100 of the computer apparatus 10 analyzes the region image 31 based on the extraction layer 1030 of the neural network data model 103 for obtaining the feature image 32.

In one of the exemplary embodiments, the feature image 32 only includes the features of images related to the object (such as the target), and filters out a part of the noise (such as background noise or variation of light and shadow) being object-independent. Thus, the present disclosed example can reduce the image interference caused by the noises, and improve the image quality of the super-resolution region image 34 generated later.

In one of the exemplary embodiments, the processor 100 may further execute the enlarging process on the feature image 32 for generating the super-resolution feature image 32' having an image size being the same as a size of the enlarged image 33 described later. More specifically, after the processor 100 generates the feature image 32, the processor 100 may further execute the enlarging process on the generated feature image 32 based on the neural network data model 103 for obtaining the super-resolution feature image 32. Thus, because the sizes of the super-resolution feature image 32' and the enlarged image 33 are the same as each other, the present disclosed example can further improve the execution speed of merging the super-resolution feature image 32' and the enlarged image 33 described later.

Step S41: the processor 100 executes the enlarging process on the region image 31 based on the enlarging layer 1031 of the neural network data model 103 for obtaining the enlarged image 33. A size of the enlarged image 33 is greater than a size of the region image.

For example, if the enlarged multiplier is 100 times (10 times for enlarging horizontally, 10 times for enlarging vertically), the image size of the region image 31 is 2×2, and the image size of the enlarged image 33 may be 20×20 (pixels).

In one of the exemplary embodiments, the processor 100 executes interpolation on the region image 31 to interpolate a plurality of pixels to the designated positions of the region image 31 for obtaining the above-mentioned enlarged image 33. The above-mentioned designated position may be the system preset position (such as interlaced interpolation) or be dynamically designated by the neural network data model 103. Moreover, the pixel values of the pixels being interpolated may be configured to the designated color (such as black, white, or the same color as the surrounding pixels) or do not configure the color.

Please be noted that the generated enlarged image 33 will show the phenomenon of significant image degradation (such as streak noise or jagged noise) when directly enlarging the region image 31 into the enlarged image 33 because the region image 13 doesn't have the enough detail information.

Step S42: the processor 100 merges the super-resolution feature image 32' with the enlarged image 33 based on the mergence layer 1032 of the neural network data model 103 for obtaining the super-resolution region image 34. The size of the super-resolution region image 34, the size of the super-resolution feature image and the size of the enlarged image 33 are the same as or the similar to each other. Moreover, the resolutions of them are higher than the resolution of the region image 31.

In one of the exemplary embodiments, if the processor 100 does not execute the enlarging process on the feature image 32 (namely, the super-resolution feature image 32' does not be generated) in the step S40, the processor 100 may be configured to combine the feature 32 with the enlarged image 33 into the super-resolution region image 34 based on the neural network data model 103 in the step S42. An image size of the super-resolution region image 34 is the same as the size of the enlarged image 33, and a resolution of the super-resolution region image 34 is higher than the resolutions of the region image 31 and the feature image 32.

In one of the exemplary embodiments, the processor 100 is configured to compute and modify the pixel value of each pixel interpolated in the step S42 based on the feature image 32 (or the super-resolution feature image 32') and the neural network data model 103.

Please be noted that the present disclosed example can make sure that there is enough detail information in the generated super-resolution region image 34 (and the super-resolution feature image 32') via predicting the pixel value of each pixel interpolated based on the neural network data model 103, and the visible phenomenon of significant image degradation (such as streak noise or jagged noise), such as the phenomenon in the enlarged image 33, will not happen.

Step S43: the processor 100 determines whether the upsampling process is finished, such as determining whether the generated super-resolution region image satisfies the designated enlarged multiplier.

If the processor 100 determines that the upsampling process is not finished, the processor 100 performs the steps S40-S42 again to generate the super-resolution region image having the higher resolution based on the currently generated super-resolution region image 34.

For example, the processor 100 may analyze the super-resolution region image 34 based on the extraction layer 1030 for obtaining the new feature image (step S40) and executing enlarging on the new feature image to obtain the new super-resolution feature image, interpolate a plurality of pixel to the current super-resolution region image 34 based on the enlarging layer 1031 to obtain the new enlarged image (step S41), and merge the new super-resolution feature image with new enlarged image to obtain the super-resolution region image having the higher resolution than the current super-resolution region image (step S42), and so on. The processor 100 performs the above steps repeatedly until the size of the newly generated super-resolution region image satisfies the value that the resolution of region image multiplying by the designated enlarged multiplier.

Thus, the present disclosed example may generate the corresponding super-resolution region image according to the enlarged multiplier designated by the user.

If the processor determines that the upsampling process is finished, the processor performs the step S13. More specifically, in the embodiment of step S13, the processor 100 maps the rough position (such as the coordinate range occupied by the region image 31 in the wide region image) onto the super-resolution region image 34. For example, the coordinate range may be the coordinate range surrounded by the coordinates (0,3), (2,2), (0,4) and (2,4).

Furthermore, the processor 100 is configured to make the rough position multiply by the enlarged multiplier of the super-resolution region image 34 (such as 10 times for enlarging horizontally, and 10 times for enlarging vertically for obtaining the coordinate range of the super-resolution region image 34. Namely, the range is surrounded by the coordinates (0,0), (20,0), (0,20) and (20,20).

Please be noted that the coordinate range of the above-mentioned super-resolution region image 34 may be understood in geometric meaning that the position of the super-resolution region image 34 in the virtual simulated super-resolution wide region image, such as the range surrounding by the dotted lines shown in FIG. 3. The above-mentioned virtual simulated super-resolution wide region image is the enlarged image which enlarging the wide region image for the same enlarged multiplier. For example, the enlarged multiplier is 10 times for enlarging horizontally, and 10 times for enlarging vertically, the four endpoints are respectively the coordinates (0,0), (40,0), (0,40) and (40,40).

Thus, the present disclosed example can obtain the position information (such as coordinate values of the super-resolution region image in the super-resolution wide region image without generating the super-resolution wide region image.

Figure 4:
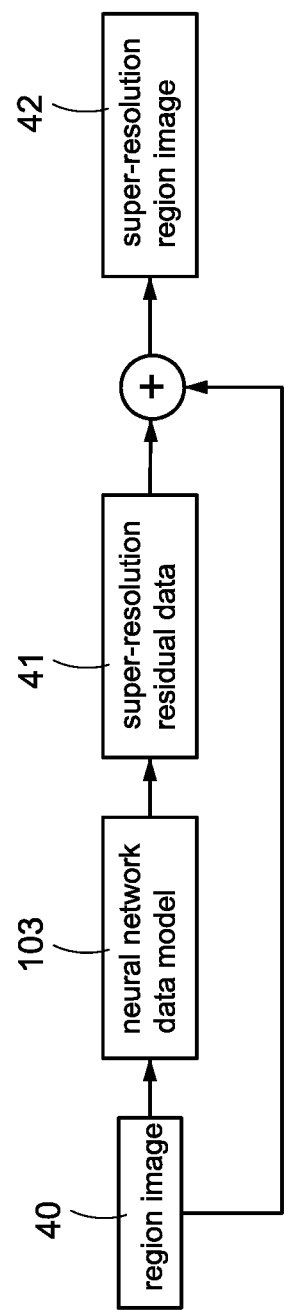
FIG. 4 is a schematic view of an upsampling process according to one implement aspect of the present disclosed example.
Figure 9:
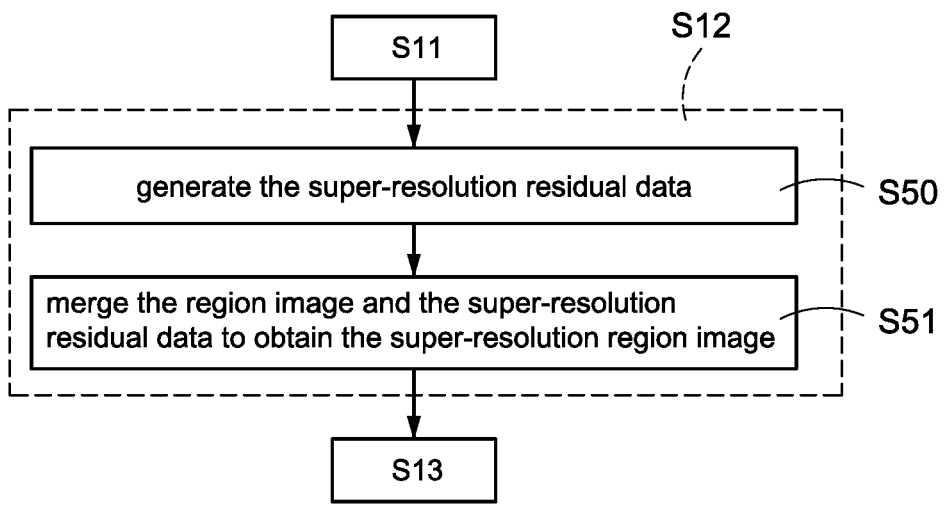
FIG. 9 is a flowchart of an upsampling process according to a fifth embodiment of the present disclosed example.

Please refer to FIG. 4, FIG. 5 and FIG. 9 together. FIG. 4 illustrates a schematic view of an upsampling process according to one implement aspect of the present disclosed example, and FIG. 9 illustrates a flowchart of an upsampling process according to a fifth embodiment of the present disclosed example.

As shown in FIG. 4, this embodiment further provides a neural network data model 103 built based on Artificial neural network technology, such as a deep residual learning network for implementing the upsampling function in a different way. Different from the embodiments shown in FIG. 2 and FIG. 8 which their neural network data models 103 are used to directly generate super-resolution residual data, the neural network data model 103 of this embodiment is to generate super-resolution residual data, and merge the super-resolution residual data with the region image having lower resolution for obtaining the super-resolution region image.

In comparison with the image positioning method shown in FIG. 5, step S12 of the image positioning method of this embodiment includes following steps for implementing the up sampling function.

Step S50: the processor 100 of the computer apparatus 10 generates the super-resolution residual data 41 based on the neural network data model 103 after retrieving the region image 40.

In one of the exemplary embodiments, the above-mentioned super-resolution residual data 41 includes a plurality of residuals, each residual expresses a difference between the actual value and the estimated value, and be the predictive value based on learning.

In one of the exemplary embodiments, the above-mentioned super-resolution residual data 41 have the same size as the super-resolution region image to be generated, such as a number of data of the super-resolution residual data is equal to a number of pixels of the super-resolution region image.

Step S51: the processor 100 merges the region image 40 with the super-resolution residual data 41 based on the neural network data model 103 for obtaining the super-resolution region image 42. This super-resolution region image 42 is the same as or similar to the super-resolution region image 34 showing FIG. 34 the relevant description is omitted for brevity.

Please be noted that because the deep residual learning network has the advantage of small network size, this embodiment can significantly reduce the amount of computation, thereby reducing execution time.

Thus, the present disclosed example can effectively improve the effectiveness of the executing the upsampling process, and generates the super-resolution region image.

Figure 10:
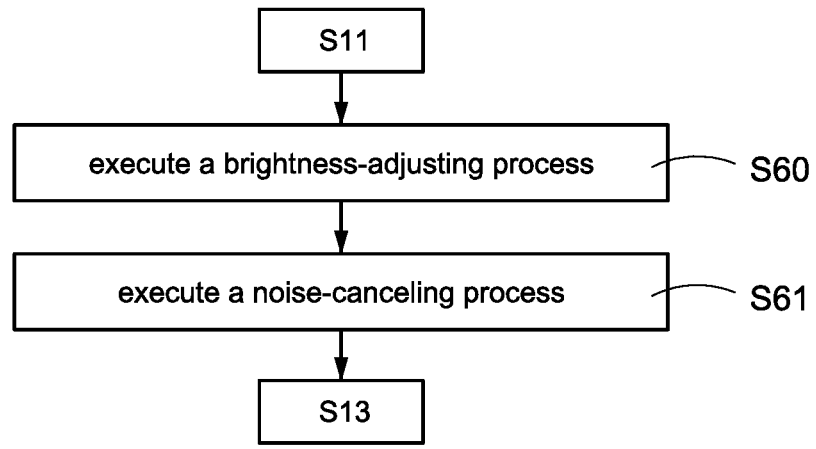
FIG. 10 is a flowchart of an image-optimizing process according to a sixth embodiment of the present disclosed example.

Please refer to FIG. 5 and FIG. 10 together. FIG. 10 illustrates a flowchart of an image-optimizing process according to a sixth embodiment of the present disclosed example. In comparison with the image positioning method shown in FIG. 5, the image positioning method of this embodiment further includes the following steps performed between the steps S11 and S13 (such as during the upsampling process or after the execution of the upsampling process) for implementing the function of optimizing the image.

Step S60: the processor 100 executes a brightness-adjusting process on the super-resolution region image based on the neural network data model 103 for adjusting the brightness distribution of the super-resolution region image.

In one of the exemplary embodiments, the present disclosed example is to add the sample images having the abnormal brightness distribution (such as too bright or too dark) and the normal brightness distribution (such as moderate brightness) during training the neural network data model 103. The above sample images have the same field of view. Thus, the neural network data model 103 built by training can execute the upsampling process and the brightness-adjusting process simultaneously. Namely, the influence of brightness deviation may be removed automatically during the computation of the pixel values of the pixels being interpolated.

Step S61: the processor 100 of the computer apparatus 10 execute a noise-canceling process on the super-resolution region image based on the neural network data model 103 for reducing the noise of the super-resolution region image.

In one of the exemplary embodiments, the present disclosed example is to add the sample images having the same field of view to training during training the neural network data model 103. A part of the sample images being added have noise, and another part of the sample images being added don't have noise or have extremely less noise. Thus, the neural network data model 103 built by training can execute the upsampling process and the noise-canceling process simultaneously. Namely, the influence of noise may be removed automatically during the computation of the pixel values of the pixels being interpolated.

Please be noted that there is not an order relationship between the step S60 and the step S61. Although step S61 is performed after step S60 in this embodiment, but this specific example is not intended to limit the scope of the present disclosed example. In another example, step S60 is performed after step S61.

Thus, the present disclosed example can effectively improve the picture quality of the super-resolution region image.

Figure 11:
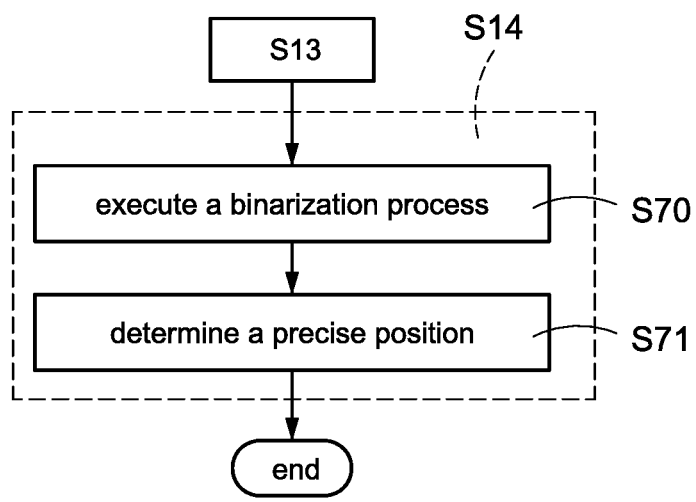
FIG. 11 is a flowchart of determining the precise position according to a seventh embodiment of the present disclosed example.

Please refer to FIG. 3, FIG. 5 and FIG. 11 together. FIG. 11 illustrates a flowchart of determining the precise position according to a seventh embodiment of the present disclosed example. In comparison with the image positioning method shown in FIG. 5, step S14 of the image positioning method of this embodiment further following steps for implementing the function of determining the precise position.

Step S70: the processor 100 of the computer apparatus 10 executes a binarization process on the super-resolution region image 34 for obtaining the super-resolution region image being halftone 34 (such as the black and white image).

Step S71: the processor 100 recognizes the target in the super-resolution region image being halftone 34, and determines the precise position of the target based on the position of the target in the super-resolution region image 34 and the mapping relationship between the rough position and the super-resolution region image. Above-mentioned precise position corresponds to the position of the target in the super-resolution wide region image.

In one of the exemplary embodiments, as shown in FIG. 3, the processor 1000 may determine the precise position of the target based on the coordinate range (for example, the range surrounded by the coordinates (0,0), (20,0), (0,20) and (20,20)) corresponding to the super-resolution region image and the position of the target in the super-resolution region image, such as the pixel position of the center of the target, namely, the coordinate (16,10).

Thus, the present disclosed example can obtain the precise position with the better accuracy of the target.

Figure 12:
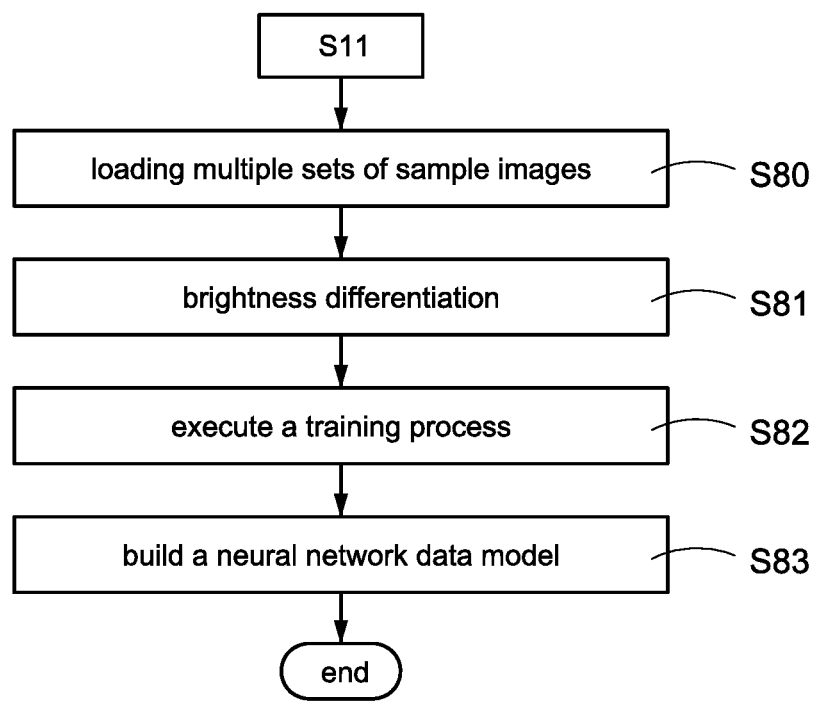
FIG. 12 is a flowchart of a training process according to an eighth embodiment of the present disclosed example.

Please refer to FIG. 5 and FIG. 12 together. FIG. 12 illustrates a flowchart of a training process according to an eighth embodiment of the present disclosed example. Compare to the image positioning method shown in FIG. 5, step S14 of the image positioning method of this embodiment further includes following steps for implementing the training function.

Step S80: the processor 100 of the computer apparatus 10 loads multiple sets of sample images. Each set of sample images may correspond to the same field of view or the different field of view, but this specific example is not intended to limit the scope of the present disclosed example.

In one of the exemplary embodiments, each set of sample images may include a low-resolution sample image and a high-resolution sample image, a field of view of the low-resolution sample image is the same as or similar to a field of view of the high-resolution sample image.

Step S81: the processor 100 executes a brightness differentiation process on the loaded multiple sets of sample images to make at least two sets of sample images have the same or similar field of view and the different brightness distributions. Thus, the brightness difference between the sample images can be increased, and the brightness optimization capability of the neural network data model 103 will be improved.

In one of the exemplary embodiments, the processor 100 may further execute a process of adding noise on the multiple sets of sample images to make at least two sets of sample images have the same field of view but the different noise density. For example, one set of sample images has noise, and another set of sample images doesn't have the noise or have less noise. Thus, the noise difference between the sample images can be increased, and the anti-noise capability of the neural network data model 103 will be improved.

Step S82: the processor 100 execute the training process on the multiple sets of the sample images.

In one of the exemplary embodiments, the processor 100 may divide each sample image into a plurality of sample sub-images having the smaller size, and execute the training process on the sample sub-images having the smaller size. Thus, the computation can be dispersed, and the demand of computation resources and storage resources can be reduced.

More specifically, the processor 100 may firstly divide each low-resolution sample image into a plurality of low-resolution sample sub-images, divide each high-resolution sample image into a plurality of high-resolution sample sub-images, and execute the training process on the low-resolution sample sub-images and high-resolution sample sub-images. A number of above-mentioned low-resolution sample sub-images and a number of above-mentioned high-resolution sample sub-images are equal to each other. Moreover, each low-resolution sample image has the same or similar field of view as the corresponding high-resolution sample image.

Step S83: the processor 100 builds the neural network data model 103 based on the training results, and stores the neural network data model 103 in the storage device 101.

Thus, the present disclosed example can effectively build the neural network data model 103.

The above-mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. An image positioning method based on upsampling, comprising following steps:
   a) fetching a region image covering a target in a wide region image and determining a rough target position in a low-precision coordinate range corresponding to the region image;
   b) executing an upsampling process on the region image based on a neural network data model for obtaining a super-resolution region image, wherein a resolution of the super-resolution region image is higher than a resolution of the region image;
   executing a noise-canceling process and a brightness-adjusting process on the super-resolution region image based on the neural network data model, wherein the neural network data model is trained with sample images having abnormal brightness distribution, having normal brightness distribution, having noise, and without noise or having extremely less noise of same field of view;
   c) mapping the rough target position onto the super-resolution region image to obtain a high-precision coordinate range; and
   d) analyzing the super-resolution region image for determining a precise target position, wherein accuracy of the precise parget position is better than accuracy of the rough target position;
   wherein the step a) comprises:
   determining whether any sub-mage of the wide region image matches a designated image or a designated pattern;
   determining a low-precision target coordinate in a matched sub-image as the rough target position when the sub-image matches with the designated image or the designated pattern;
   expanding outward a designated distance from the low-precision target coordinate to obtain the low-precision coordinate range; and
   obtaining the region image by cropping the wide region image based on the low-precision coordinate range;
   wherein the step c) comprises:
   determining the high-precision coordinate range of the super-resolution region image based on the rough target position and at least one enlarged multiplier;
   wherein the step d) comprises:
   determining a high-precision target coordinate in the high-precision coordinate range as the precise target position.

2. The image positioning method based on upsampling according to claim 1, further comprising a step performed before the step a): controlling an image capture apparatus to capture image of the target for generating the wide region image.

3. The image positioning method based on upsampling according to claim 2, wherein the target is an image of a designated element or a designated structure on a printed circuit board;
   wherein the image positioning method based on upsampling further comprises a step performed after the step d): controlling an automation apparatus execute an assembling process at the precise position of the printed circuit board.

4. The image positioning method based on upsampling according to claim 1, wherein the step b) comprises following steps:
   b1) analyzing the region image based on an extraction layer of the neural network data model for obtaining a feature image;
   b2) executing interpolation on the region image based on an enlarging layer of the neural network data model to interpolate a plurality of pixels to the region image for obtaining an enlarged image; and
   b3) merging the feature image with the enlarged image based on a mergence layer of the neural network data model for obtaining the super-resolution region image.

5. The image positioning method based on upsampling according to claim 4, wherein the step b1) is performed to analyze the region image based on the extraction layer for obtaining the feature image, and execute an enlarging process on the feature image based on the neural network data model for obtaining a super-resolution feature image; the step b3) is performed to merge the super-resolution feature image with the enlarged image to obtain the super-resolution region image.

6. The image positioning method based on upsampling according to claim 5, wherein the step b) further comprises following steps:
   b4) analyzing the super-resolution region image based on the extraction layer of the neural network data model for obtaining the feature image being new, and executing the enlarging process on the feature image being new based on the neural network data model for obtaining the super-resolution feature image being new;
   b5) executing interpolation on the super-resolution region image based on the enlarging layer of the neural network data model to interpolate a plurality of pixels to the super-resolution region image for obtaining the enlarged image being new; and
   b6) merging the super-resolution feature image being new with the enlarged image being new based on the mergence layer of the neural network data model for obtaining the super-resolution region image being new.

7. The image positioning method based on upsampling according to claim 6, wherein the step b) comprises following steps:
   b7) generating super-resolution residual data based on the neural network data model; and
   b8) merging the region image with the super-resolution residual data based on the neural network data model for obtaining the super-resolution region image.

8. The image positioning method based on upsampling according to claim 4, wherein the extraction layer, the enlarging layer, and the mergence layer of the neural network data model are built based on convolutional neural network.

9. The image positioning method based on upsampling according to claim 1, wherein a resolution of the super-resolution region image is equal to a resolution of the region image multiplied by the at least one enlarged multiplier, and the at least one enlarged multiplier comprises an horizontal enlarged multiplier and an vertical enlarged multiplier; in the step c), the high-precision coordinate range of the super-resolution region image is obtained by the rough target position multiplying by the horizontal enlarged multiplier in horizontal direction and the vertical enlarged multiplier in vertical direction.

10. The image positioning method based on upsampling according to claim 1, wherein the step d) comprises following steps:
    d1) executing a binarization process on the super-resolution region image for obtaining the super-resolution region image being halftone; and
    d2) recognizing the target in the super-resolution region image being halftone.

11. The image positioning method based on upsampling according to claim 1, further comprising following steps performed before the step b):
    loading multiple sets of sample images, wherein each set of sample images comprises a low-resolution sample image and a high-resolution sample image, a field of view of the low-resolution sample image is the same as or similar to a field of view of the high-resolution sample image; and
    executing a training process on the multiple sets of sample images for building the neural network data model.

12. The image positioning method based on upsampling according to claim 11, wherein at least two sets of sample images have the same field of view and the different brightness distribution.

13. The image positioning method based on upsampling according to claim 11, wherein the step of executing the training process on the multiple sets of sample images for building the neural network data model is performed to divide each low-resolution sample image into a plurality of low-resolution sample sub-images, divide each high-resolution sample image into a plurality of high-resolution sample sub-images, and execute the training process on the low-resolution sample sub-images and the high-resolution sample sub-images, wherein a number of the low-resolution sample sub-images is equal to a number of high-resolution sample sub-images, a field of view of each low-resolution sample sub-image is the same as or similar to a field of view of the high-resolution sample sub-image corresponding to the low-resolution sample sub-image.

14. An image positioning system based on upsampling, comprising:
    an image capture apparatus used to capture image of a target for generating a wide region image;
    a storage device used to store a neural network data model, wherein the neural network data model is trained with sample images having abnormal brightness distribution, having normal brightness distribution, having noise, and without noise or having extremely less noise of same field of view; and
    a processor electrically connected to the image capture apparatus and the storage device, the processor being configured to
    fetch a region image covering the target in the wide region image and determine a rough target position in a low-precision coordinate range corresponding to the region image,
    execute an upsampling process on the region image based on the neural network data model for obtaining a super-resolution region image,
    execute a noise-canceling process and a brightness-adjusting process on the super-resolution region image based on the neural network data model;
    mapping the rough target position onto the super-resolution region image to obtain a high-precision coordinate range, and
    determine a precise target position by analyzing the super-resolution region image, wherein a resolution of the super-resolution region image is higher than a resolution of the region image, and an accuracy of the precise target position is better than an accuracy of the rough target position;
    wherein the processor is configured to
    determine whether any sub-image of the wide region image matches a designated image or a designated pattern,
    determine a low-precision target coordinate in a matched sub-image as the rough target position when the sub-image matches with the designated image or the designated pattern,
    expand outward a designated distance from the low-precision target coordinate to obtain the low-precision coordinate range, and
    obtain the region image by cropping the wide region image based on the low-precision coordinate range;

wherein the processor is configured to
determine the high-precision coordinate range of the super-resolution region image based on the rough target position and at least one enlarged multiplier;
wherein the processor is configured to
determine a high-precision target coordinate in the high-precision coordinate range as the precise position.

* * * * *